United States Patent [19]

Murata et al.

[11] 3,942,548

[45] Mar. 9, 1976

[54] FLUID CONTROL VALVE

[75] Inventors: Hikaru Murata, Gifu; Yasuji Umeda, Minokamo; Yasusada Sakurai; Yasuo Doi, both of Gifu, all of Japan

[73] Assignee: Kayabakogyokabushikikaisha, Tokyo, Japan

[22] Filed: Nov. 25, 1974

[21] Appl. No.: 526,696

Related U.S. Application Data

[63] Continuation-in-part of Ser. No. 319,306, Dec. 29, 1972, Pat. No. 3,884,253.

[30] Foreign Application Priority Data

Nov. 26, 1973 Japan .............................. 48-132937

[52] U.S. Cl. .................................. 137/110; 137/117

[51] Int. Cl.[2] ............................................ G05D 7/01

[58] Field of Search ............................ 137/110, 117

[56] References Cited

UNITED STATES PATENTS

| | | | |
|---|---|---|---|
| 2,053,330 | 9/1936 | Fitch | 137/110 |
| 2,665,704 | 1/1954 | Kanuch | 137/110 |
| 2,808,068 | 10/1957 | Thomas | 137/110 |

*Primary Examiner*—Robert G. Nilson
*Attorney, Agent, or Firm*—Saul Jecies

[57] ABSTRACT

A fluid control valve, which relates to fluid control valves in which a pilot passage is opened or closed as a pilot flow is detected in the said pilot passage by means of a limit orifice mechanism located at the middle of the flow and a valve spool is switched by the differential pressure produced in the fluid passing the said limit orifice mechanism so as to effect a switchover between unloaded and loaded states, and incorporates, as the said valve spool, a first valve spool effecting the switching action based on the differential pressure of the fluid passing the limit orifice mechanism and a second valve spool arranged in series with the first valve spool effecting a switching action being effected by the fluid pressure so that a load check function may also be provided.

4 Claims, 31 Drawing Figures

FIG. 4
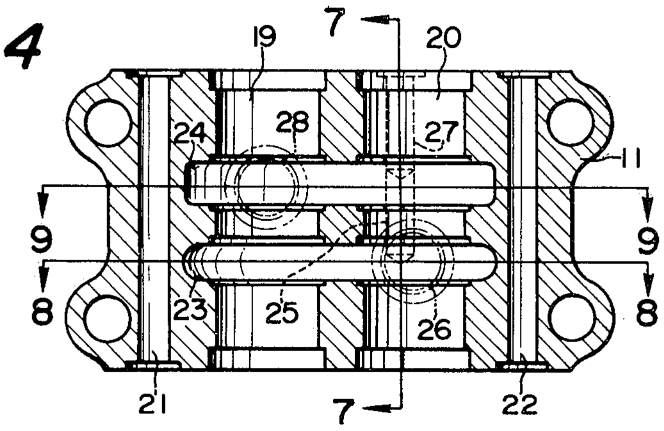
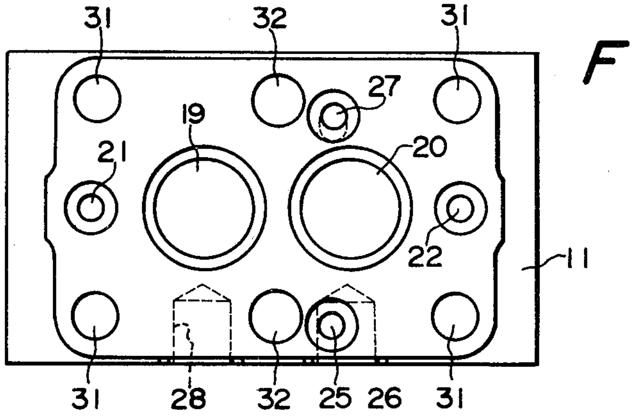
FIG. 5
FIG. 6
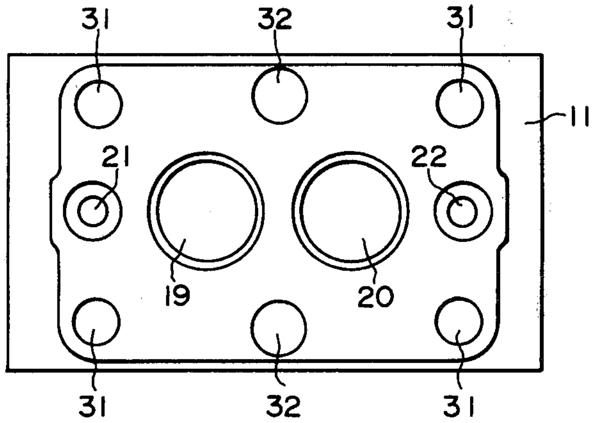

FIG. 10
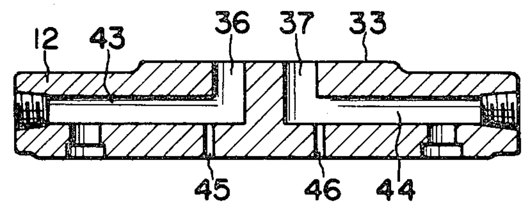
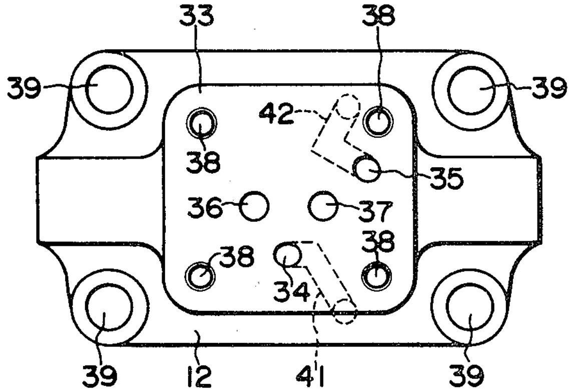
FIG. 11
FIG. 12
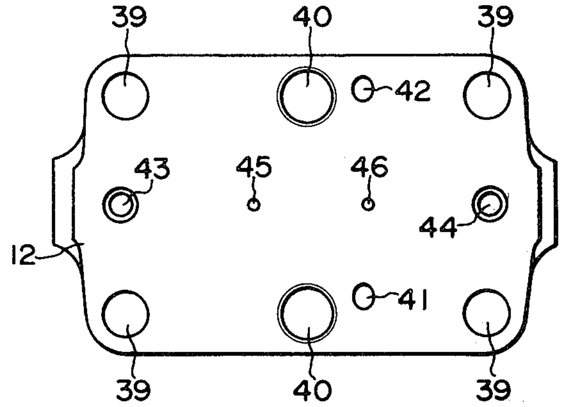
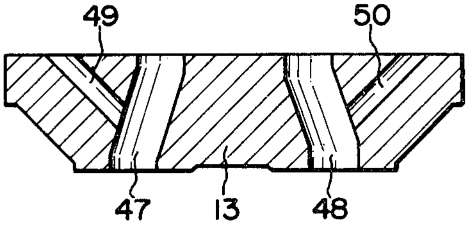
FIG. 13

FIG. 14
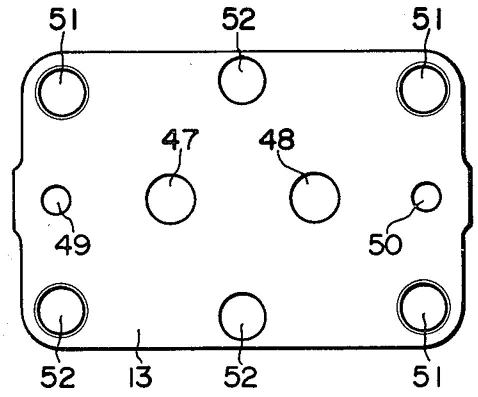
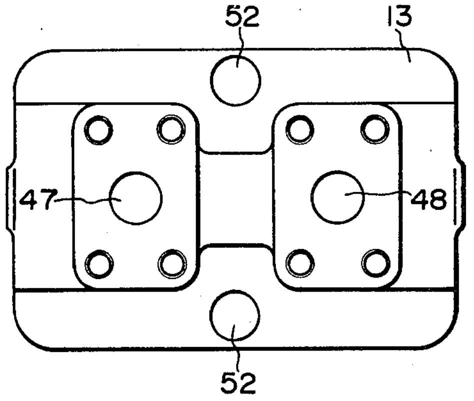
FIG. 15
FIG. 16
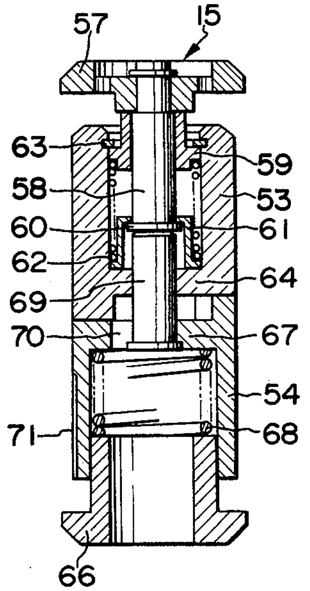
FIG. 17
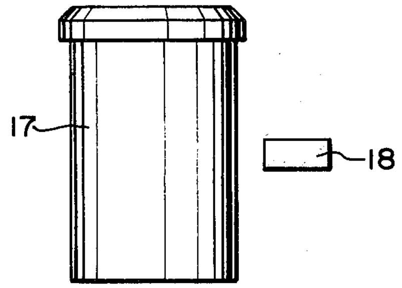

FLUID CONTROL VALVE

CROSS-REFERENCE TO RELATED APPLICATION

The present application is a continuation-in-part application of our prior application Ser. No. 319,306 filed Dec. 29, 1972, now U.S. Pat. No. 3,884,253, granted May 20, 1975.

BACKGROUND OF THE INVENTION

The present invention relates to a fluid control valve used for hydraulic actuating systems. More specifically, it relates to a fluid control valve which can be used for multi-purposed control of large volume main flows by utilizing pilot flows of a small volume.

Although the method of controlling main flows of large volume by using their small volume pilot flows is generally used in hydraulic actuating systems, no single fluid control valve applicable for various control purposes is yet available. According to each case, therefore, several fluid control valves each having a specific purpose and construction must be employed in combination to form an appropriate circuit module. In order to meet each circuit requirement, various fluid control valves having various functions are required. Such a lack in versatility of fluid control valves makes their standardization difficult, and is also disadvantageous for production control.

In view of above, we have already presented a unique fluid control valve which may resolve the said defect in our Application No. 319306 filed Dec. 29, 1972 (No. 60058 in the United Kingdom, No. 160264 in Canada and No. P2264091.1 in F.R. Germany). In the said invention, however, even though the fluid control valve for a pump section may be provided with a load, no-load function or with a main relief function by installing an on-off valve or a main relief valve in its pilot circuit, it has not been possible to provide a load-check function which is necessary in most cases involving fluid control valves of this kind for pump section use. In cases where the load-check function is required, therefore, a load-check valve must be installed in the circuit. Thus, it is desirable for every fluid control valve used in the pump section to perform the load-check function also.

In addition, although the fluid control valve we have presented before is very versatile as compared with conventional ones, fluid control valves differing in valve body construction, and complex circuit compositions are required in some cases, depending on whether the valve is used in the pump section or the cylinder section, whether a carryover function is required or not, and whether special circuits such as a quick-feed circuit or a high-low speed switchover circuit are involved or not. If a single fluid control valve applicable for all these various uses without change in its valve body construction is developed, it should produce a tremendous effect on production control due to its increased versatility.

SUMMARY OF THE INVENTION

In view of above, the primary purpose of the present invention is to present an improved fluid control valve of a kind which provides itself with a load-check function.

Another purpose of the present invention is to present a fluid control valve of a kind which is applicable to various control purposes by changing only valve spools located in the valve body.

To achieve these purposes in the present invention, a split-type valve spool consisting of a first valve spool and a second valve spool arranged in series is incorporated in the valve body in such a manner that the first valve spool may effect the switching function to open a return passage by the use of a produced pilot flow and that the second valve spool may effect the switching function to open a supply passage by the use of hydraulic pressure. It is also designed so that the second valve spool may perform the load-check function on the fluid control valve itself.

Furthermore, in the present invention, the valve body having two cylindrical valve chambers may hold either a valve spool of conventional non-split type, a valve spool of the present split type or a blind stopper so as to meet every need in various applications.

The abovementioned and other purposes, features and performance of the present invention will be clarified further in the following explanation using application examples referring to the attached figures.

BRIEF DESCRIPTION OF THE DRAWINGS

FIG. 4 represents a vertical front view of the body part of the valve body in section.

FIG. 5 represents a plan view of the same.

FIG. 6 indicates the base view of the same.

FIG. 10 represents a vertical front view of its upper cover in section.

FIG. 11 represents a plan view of the same.

FIG. 12 indicates the base view of the same

FIG. 13 represents a vertical front view of its lower cover in section.

FIG. 14 represents a plan view of the same.

FIG. 15 indicates the base view of the same.

FIG. 16 represents a vertical front view indicating an example of split type valve spool in section.

FIG. 17 represents a front view of blind stoppers.

DESCRIPTION OF THE PREFERRED EMBODIMENT

The attached figures indicate several complete application examples which are composed to show the most significant advantages in the application of principles of the present invention.

Figure 1:
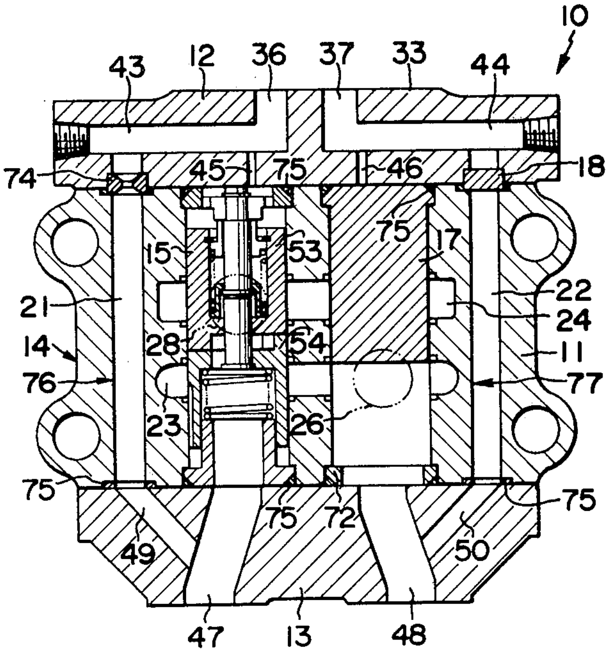
FIG. 1 represents a vertical front view showing the fluid control valve of the present invention in section.

In FIG. 1, a fluid control valve 10 constructed according to the present invention comprises a valve body 14, which consists of a body part 11, upper and lower covers 12, 13, a valve spool 15 and blind stoppers 17, 18, which are incorporated in the said body part 11.

As seen in FIGS. 4 – 9, the body part 11 of the valve body 14 is provided with two pairs of valve chambers 19, 20 and parallel vertical passages 21, 22 and two annular grooves 23, 24 formed around the middle of the said valve chambers 19, 20 to connect them and two pairs of channels 25, 27 and outer ports 26, 28 connected to the annular grooves 23, 24 respectively, where the channels 25, 27 open onto the upper surface of the body part 11 while the outer ports 26, 28 open onto the side of the body part 11. In order to facilitate the boring of these channels 25, 27 and the outer ports 26, 28 in this case, extensions 23*a*, 24*a* are formed in the present example by extending opposite walls of the two annular grooves 23, 24 to both sides. Thus, the outer ports 26, 28 may be bored from outside of the body part 11 towards the extensions 23*a*, 24*a*, while channel 25 may be bored from the upper surface of the body part 11 towards the extension 23*a* of the lower annular groove 23 avoiding the upper annular groove 24, and the other channel 27 may be bored somewhat diagonally towards the annular part of the upper annular groove 24. In addition, the body part 11 is provided with through holes 31, 32 bored vertically for bolts 29, 30 (See FIGS. 2 and 3.) to attach the upper and the lower covers 12, 13.

As seen in FIGS. 10 – 12, the cover 12 for the top of the body part 11 has a valve adapter seat 33 on the outer surface. In a portion of the said valve adapter seat 33, are a supply port 34 and discharge port 35 for pilot use, two pilot ports 36, 37 and screw holes 38 for fixing the valves open so the valves fit to passages and attachment holes of standard solenoid valves. In addition, attachment holes 39 and screw holes 40 are bored in the peripheral part of the cover 12, said screw holes fitting to the said through holes 31, 32 of the body part 11. The supply and discharge ports 34, 35 and the pilot ports 36, 37 lead to the lower surface of cover 12 through passages 41, 42 bored diagonally from the upper and the lower surfaces of cover 12 and through L-type passages 43, 44, respectively, so that they may be connected to channels 25, 27 and passages 21, 22 of the body part 11 when the cover 12 is attached to the top of the body part 11. In addition, the passages 43, 44 connected to the pilot ports 36, 37 have branching damper orifices 45, 46 which lead to the top of valve chambers 19, 20 of the body part 11 respectively.

Next, as shown in FIGS. 13 – 15, the cover 13 for the bottom of the body part 11 is provided with two outer ports 47, 48 bored longitudinally through both left and right sides, respectively, passages 49, 50, branching from the channels of the outer ports 47, 48 and opening onto the upper surface, and screw holes 51 and attachment holes 52 which fit to through holes 31, 32 of the body part 11. Thus, the outer ports 47, 48 and their branch passages 49, 50 may be connected to valve chambers 19, 20 and passages 21, 22 of the body part 11 at the bottom, respectively, when the cover 13 is attached to the bottom of body part 11 by means of these screw holes 51 and attachment holes 52.

As shown in FIG. 16, a split type valve spool 15, consisting of a first valve spool 53 and a second valve spool 54 arranged vertically, is held in the valve chamber 19 of the body part 11. The first valve spool 53 is provided with a bush 57 at the top, whose guide 58 protrudes into the first valve spool 53, while center springs 62 are set between two spring holders 59, 61 inserted into the base and top of the said guide 58, respectively, spring holder 61 being fastened to the top by means of a rim 60, so that the first valve spool 53 may be kept normally at a certain position against the said bush 57 by means of the center spring 62, where the spring holder 59 contacts a snap ring 63 attached to the first valve spool 53 while the lower end of the other spring holder 61 contacts the partition wall 64 formed in the first valve spool 53. The second valve spool 54, arranged in series with the first, is provided with a spring holder 66 sliding freely in the lower part and spring 68 set between the upper end of the said spring holder 66 and partition wall 67 formed in the upper part of the second valve spool 54, so that the top of guide 58 of said bush 57 may be normally in contact with the top of a rod 69 extending upwards from the partition wall 67 and held there by the restoring force of the spring 68 when spring holder 66 is pressed under certain conditions. The partition wall 67 is provided with a through hole 70 connecting the upper and the lower parts, while the second valve spool 54 is notched around the outer circumference of the lower part to form vertical grooves 71.

Next, as shown in FIG. 17, blind stoppers 17, 18 held in the other valve chamber 20 side of the body part 11 are used to close the upper part of the valve chamber 20 and the upper end of its side passage 22, respectively. The upper part of the former blind stopper 17 is formed in the same shape as the bush 57 of the said valve spool 15, while its lower part is made as a cylinder having a length sufficient to close the upper annular groove 24 of the body part 11 when it is inserted into the valve chamber 20. The latter blind stopper 18 is made as a cylinder identical in shape to the detection orifice which will be described below.

Figure 2:
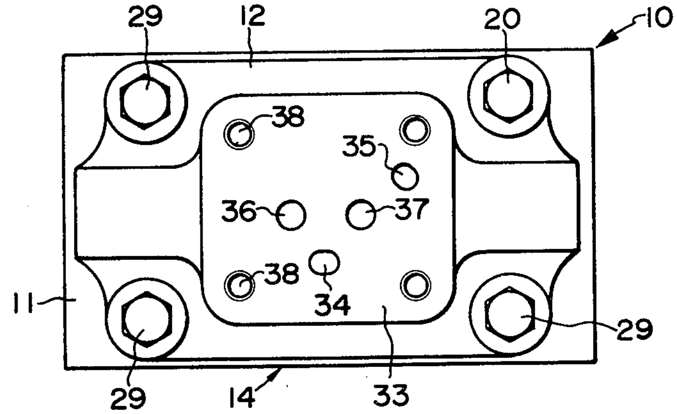
FIG. 2 represents a plan view of the same.
Figure 3:
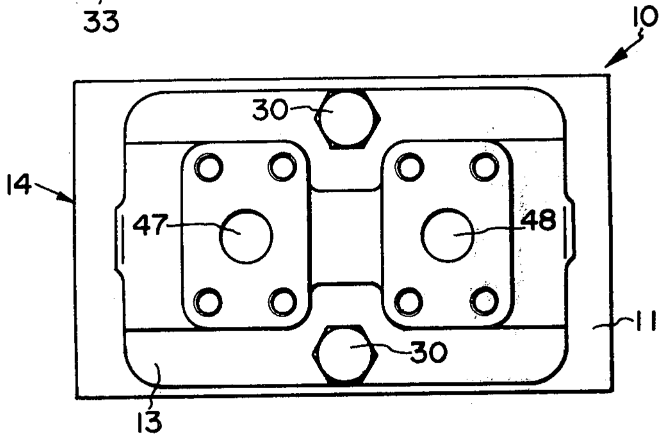
FIG. 3 indicates the base view of the same.
Figure 7:
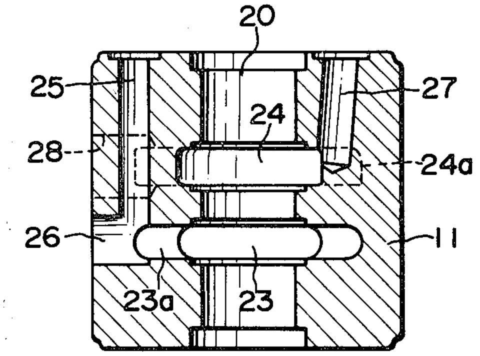
FIG. 7 represents a vertical side view along Line 7—7 of the abovementioned FIG. 4 of a sectioned valve.
Figure 8:
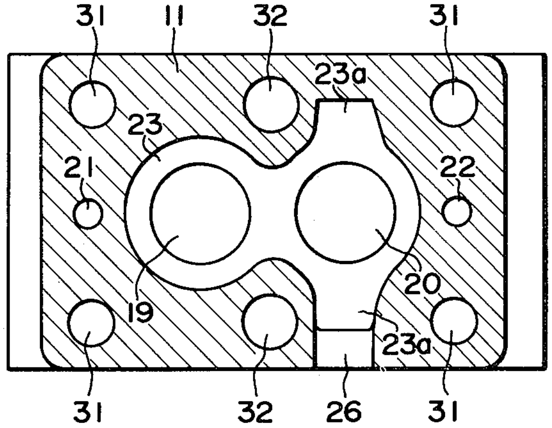
FIGS. 8 and 9 represent cross-sectional plan views along Lines 8—8 and 9—9 respectively of the same FIG. 4.
Figure 9:
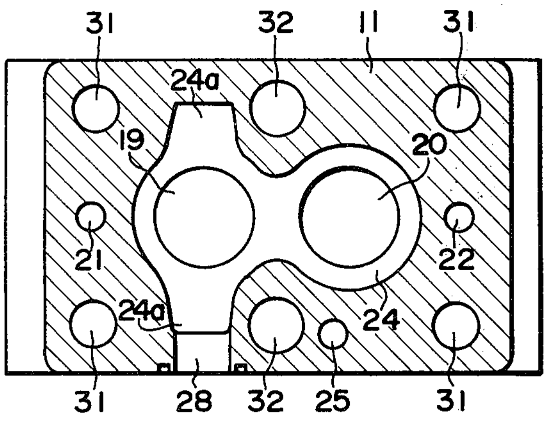

Now, as seen in FIGS. 1 – 3, the split type valve spool 15 is placed in valve chamber 19 of the said body part 11, while the blind stopper 17 and packing holder 72 are arranged in the upper and the lower parts of the other valve chamber 20, respectively. In addition, detection orifice 74 and blind stopper 18 are fitted to the inner surface part of passages 43, 44 of the upper cover 12. After the body part 11 is fitted with covers 12, 13 at the top and the bottom, respectively, with use of packings 75 as required, they are fastened together by means of through bolts 29, 30 and their respective through holes 31, 32 attachment holes 39, 52 and screw holes 40, 51. Thus, outer ports 47, 48 of the lower cover 13 are connected not only to the lower part of valve chambers 19, 20 of the body part 11, but also to pilot ports 36, 37 of the upper cover 12 through pilot passages 76, 77 consisting of passages 49, 21, 43 and passages 50, 22, 44 respectively (in this case, however, the latter pilot passage 77 is closed by the use of a blind stopper 18.), while damper orifices 45, 46 branching from passages 43, 44 of the upper cover 12 open to the upper part of valve chambers 19, 20 of the body part 11, respectively. Furthermore, outer port 26 of the body part 11 becomes connected to supply port 34 of the upper cover 12 through passages 25, 41 from the lower annular groove 23, while the other outer port 28 becomes connected to the discharge port 35 through passages 27, 42 from the upper annular groove 24. In the said condition, the first and the second valve spools 53, 54 in the split-type valve spool 15 arranged in the valve chamber 19 of the body part 11 are kept normally in a position such as to close the upper and the lower grooves 24, 23, respectively, as shown in FIG. 1.

Figure 18:
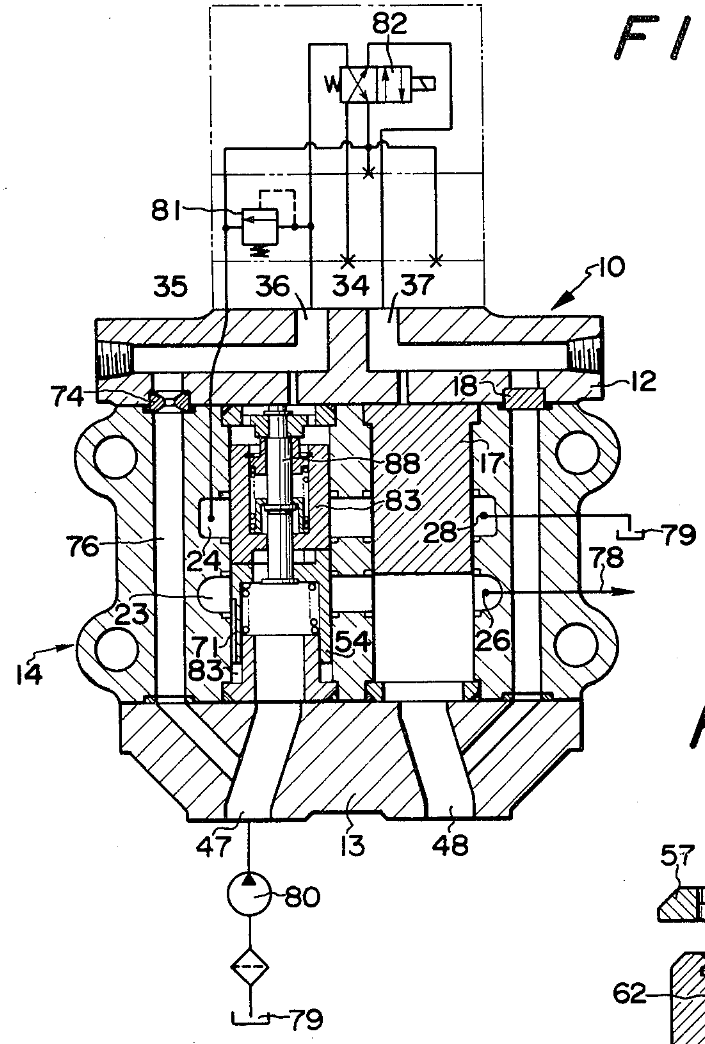
FIG. 18 represents a circuit diagram indicating an application example of the fluid control valve abovementioned in FIG. 1.

In the use of the fluid control valve 10 shown in FIG. 1, therefore, when outer ports 26, 28 of the valve body 14 are connected to supply circuit 78 and a tank 79, when outer port 47 of the lower cover 13 is connected to pump 80 and when relief valve 81 and solenoid valve 82 of the valve assembly for pilot use are attached to the upper cover 12 as shown in FIG. 18, the hydraulic actuating fluid from the pump 80 flows as a pilot flow from the outer port 47 to the tank 79 side through pilot passage 76 — detection orifice 74 — pilot port 36 — solenoid valve 82 — discharge port 35 — annular groove 24 and outer port 28 as long as the solenoid valve 82 is unactivated and kept in the left side position. Thus, the said pilot flow causes a differential pressure in front of and behind the detection orifice 74 and, due to the differential pressure, the first valve spool 53 in the split-type valve spool 15 moves upwards to connect the outer port 47 and the annular groove 24. In this case the second valve spool 54 in the split-type valve spool 15 does not move upwards following the first valve spool 53 but is left in the original position being confined by guide 58, so that the first valve 53 may be free from the influence of forces working upwards on the second valve spool 54. Accordingly, the hydraulic actuating fluid sent from the pump 80 flows as the main flow from the outer port 47 to the tank 79 side directly through the annular groove 24 and the outer port 28, pump 80 thus being kept without load.

On the contrary, when solenoid valve 82 is activated and switched to the right side position, the pilot flow towards tank 79 will stop and the differential pressure occuring in front of and behind the detection orifice 74 will disappear. Thus, the first valve spool 53 in split-type valve 15 returns to the original neutral position to open the connection between the outer port 47 and the annular groove 24. As a result, since lower chamber 83 of the second valve spool 54 in the split-type valve spool 15 is connected to the annular groove 23 through groove notches 71 formed around the outer circumference of the second valve spool 54 at its lower part, the hydraulic actuating fluid from pump 80 works on the opposite part to open said second valve spool 54 downwards and flow goes from the outer port 47 not only into the supply circuit 78 side through the annular groove 23 and the outer port 26 but also into the other, outer port 48 side, pump 80 thus being kept under load. In this case, the latter outer port 48 is used as a service port, being closed with a blind stopper when its use is unnecessary.

In the said loaded condition, if the pressure of the supply circuit 78 side rises above a set pressure of the relief valve 81, relief valve 81 will open and a return pilot flow from the outer port 47 to the tank 79 side through the pilot passage 76 — pilot port 36 — relief valve 81 — discharge port 35 — annular groove 24 — and outer port 28 will be produced. Thus, a differential pressure is produced again in front of and behind the detection orifice 74. As a result, the first valve spool 53 starts to move upwards and keeps the pressure of the supply circuit 78 side identical to the set pressure of the relief valve 81 while partially feeding back the hydraulic actuating fluid from the pump 80 to the tank 79 from the outer port 47 through the annular groove 24 and outer port 28. Now, it will be realized that the fluid control valve 10 shown in FIG. 18 may be used as a control valve unit for no-load, load, main relief use and that the second valve spool 54 in split-type valve spool 15 may function as a load check valve, performing a load check function on the fluid control valve 10.

In the said fluid control valve 10, one of the valve chambers 20 and pilot passage 77 are closed by placing blind stoppers 17, 18 within them, so that the valve body having two valve chambers 19, 20, two pilot passages 76, 77 and two outer ports 47, 48 for cylinder section use may also be employed for pump section use. From the viewpoint of the present invention that fluid control valves of this kind should be provided with the load check function, it will be noted that one of these two series of valve chambers, pilot passages and outer ports may be omitted without inviting any functional troubles.

Figure 19:
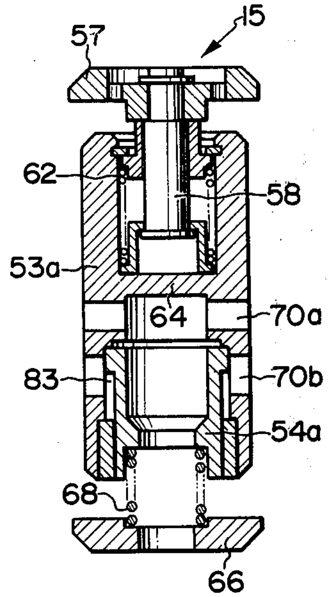
FIG. 19 represents a vertical front view, in section, of an example of a modified valve spool of the split type shown in FIG. 16.

Split-type valve spool 15 is not limited to the construction shown in FIG. 16. For instance, as shown in FIG. 19, the second valve spool 54*a* for load-check use may be attached to the lower part of the first valve spool 53*a* provided with through holes 70*a*, 70*b* so as to enable it to open and close said through hole 70*b* on the first valve spool 53*a* side. The reason is that when the first valve spool 53*a* works to switch upwards during no-load times, the first and the second valve spools 53*a*, 54*a* will move together while through hole 70*b* of the former is closed by the latter, to open the other through hole 70*a* to the upper annular groove 24 of the valve body 14. During load condition, only the second valve spool 54*a* will descend, being affected by the hydraulic pressure, to open through hole 70*b* leading to the lower annular groove 23 on the valve body 14 side. Thus, the second valve spool 54*a* in this case also functions as a load-check valve.

Figure 20:
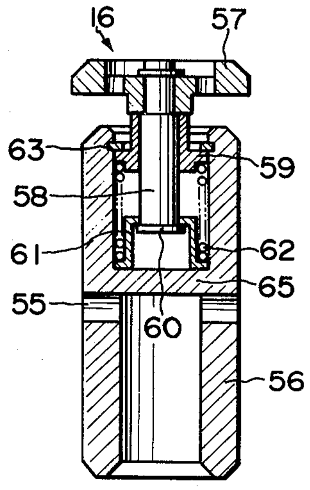
FIG. 20 represent a vertical front view of a conventional valve spool of the non-split type in section.

Explanation has been made hitherto of a fluid control valve 10 having a load-check function. According to the present invention, however, valve spools of other types may also be employed in addition to the said split-type valve spool 15 with blind stoppers 17, 18. For instance, as shown in FIG. 20, a conventional non-split type valve spool 16 having the same center spring mechanism as that of the said split-type valve spool 15 may be attached to the upper part of valve spool 56 having a through hole 55 at the side and a partition wall 65 at its center. Since these valve spools may be arranged as desired in the two valve chambers 19, 20 of the valve body 14, it is thus possible to fabricate a multipurpose fluid control valve having various functions by employing the valve body 14 for cylinder use.

Referring to the following examples, this will be explained further.

Figure 21:
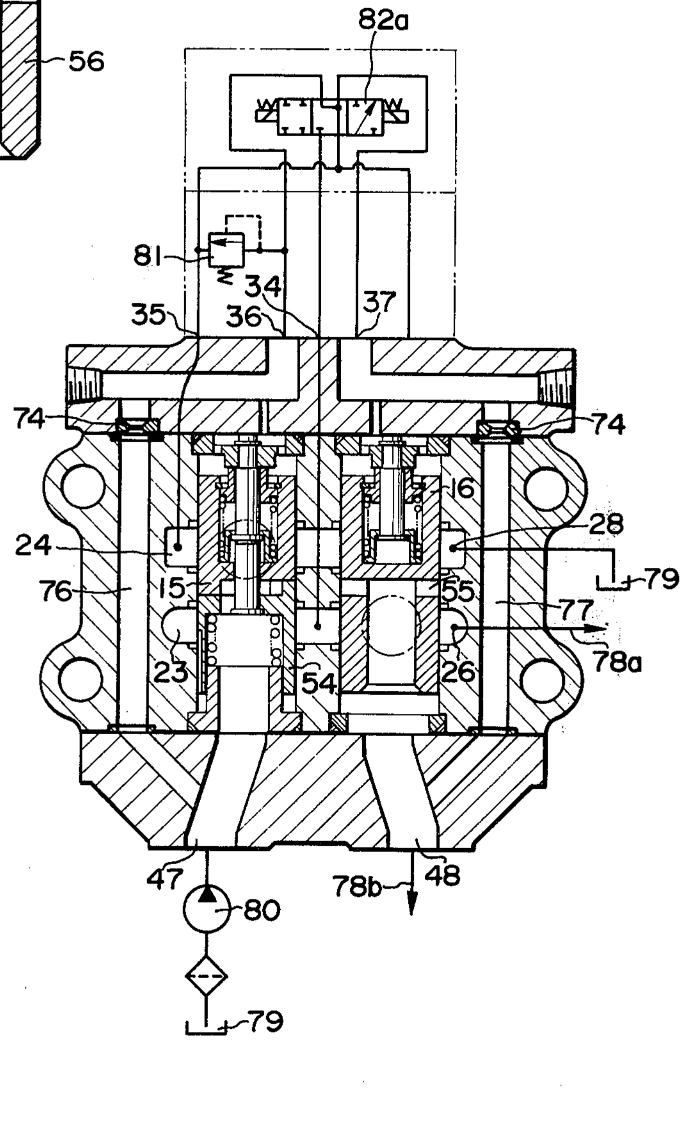
FIG. 21 represents a circuit diagram indicating an application example where a fluid control valve is commonly used for various purposes including load, no-load, main relief and carryover.

As was stated referring to FIG. 18, a fluid control valve for no-load, load, and main relief use may be fabricated from a split-type valve spool 15 and blind stoppers 17, 18. In addition, for instance, as shown in FIG. 21, in the case where valve spools of split-type 15 and non-split type 16 are arranged in valve chambers 19, 20 respectively and a three-position solenoid valve 82*a* as shown in the figure is employed, it will be not only possible to switch the pump 80 between no-load and load to send the hydraulic actuating fluid to the primary side supply circuit 78*a* as in the case of FIG. 18 by switching the solenoid valve 82*a* to the center position or the left side, but also to send the hydraulic actuating fluid from the annular groove 23 to the secondary side supply circuit 78*b* through supply port 34 — solenoid valve 82*a* — pilot port 37 — detection orifice 74 — pilot passage 77 and outer port 48 by switching the solenoid valve 82*a* to the right side position while keeping the pump under load. Therefore, the non-split type valve spool 16 will be switched downwards to let the through hole 55 open through to the annular groove 23 and the hydraulic actuating fluid sent to the annular groove 23 from the pump 80 through the second valve spool 54 of the split-type valve spool 15 will be led from the annular groove 23 to the secondary side supply circuit 78*b* by through hole 55 of valve spool 16 and outer port 48. In such a manner, a fluid control valve having a carryover function as well as the no-load, load, and main relief function may be accomplished. In this case, when the set relief pressure of the secondary or carryover side is higher than that of the primary side as adjusted by the relief valve 81, it will be necessary to prevent incorrect action by using a check valve to prevent flow towards the solenoid valve 82*a* from the pilot port 37.

Figure 23:
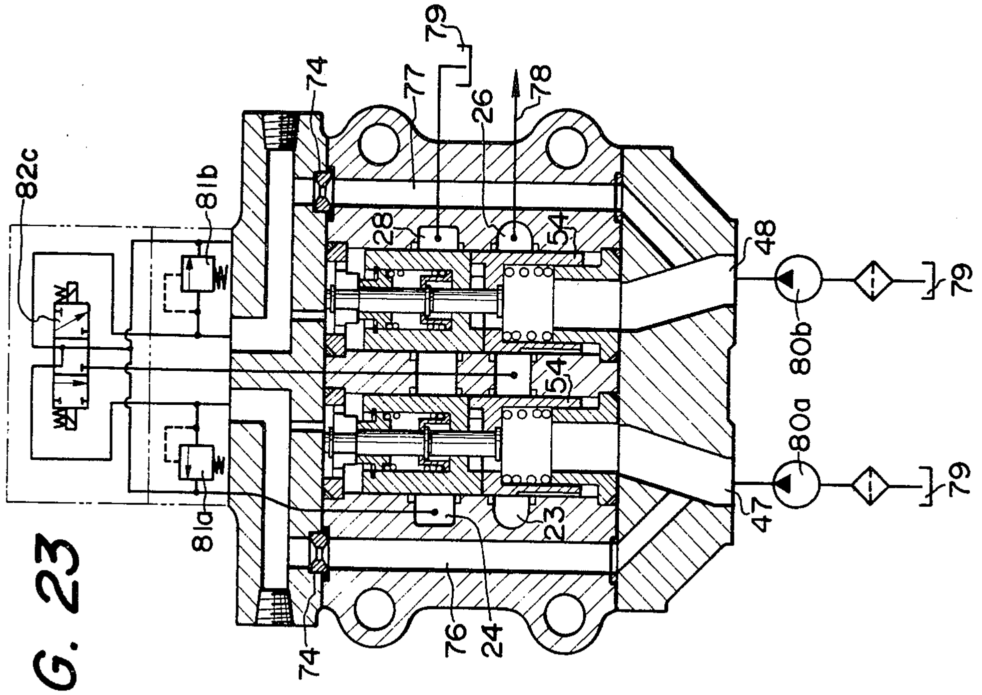
FIGS. 22, 23 and 24 represent circuit diagrams indicating an application example of the fluid control valve used for a two-series pump circuit.
Figure 22:
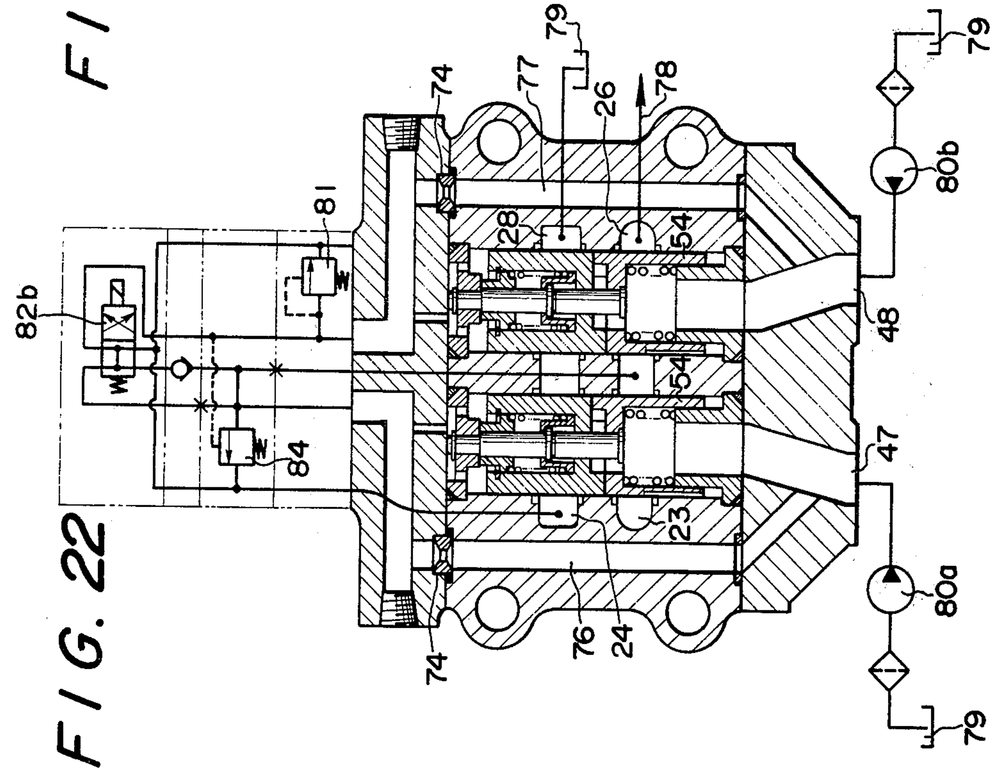
Figure 24:
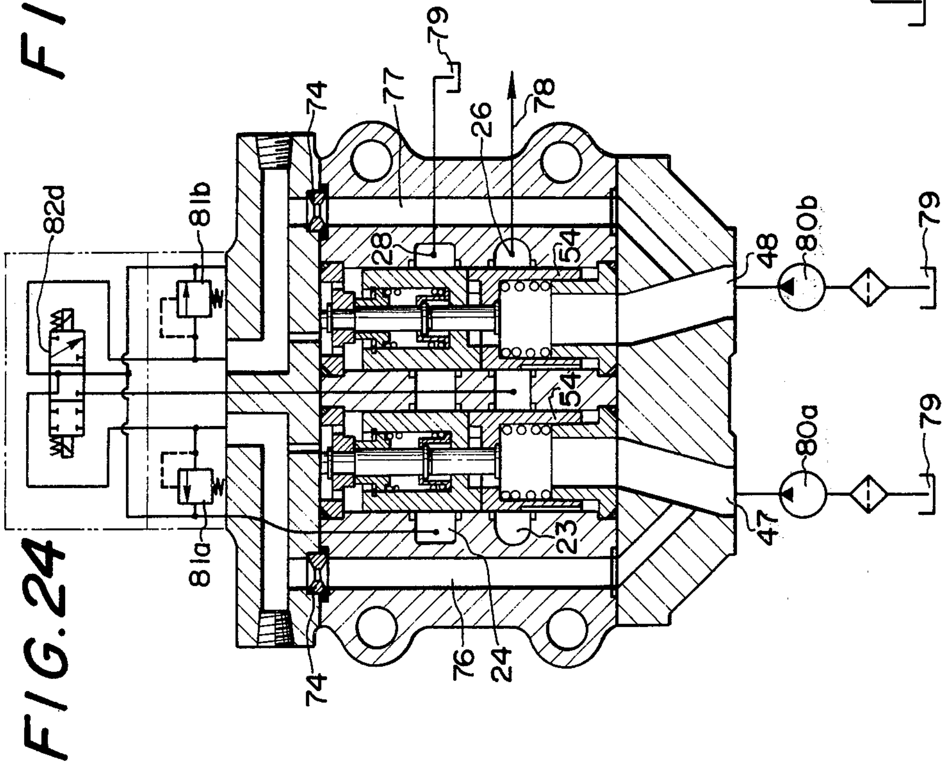

FIG. 22 indicates an example where a two-series pump circuit is employed by using a split-type valve spool 15 in each of the valve chambers 19, 20. Namely, in this example, pilot flows are produced from low pressure pump 80*a* and high pressure pump 80*b* towards tank 79 through both pilot passages 76, 77 by keeping solenoid valve 82*b* in the left side position, so that both pumps 80*a* and 80*b* may be kept without load. If the solenoid valve 82*b* in the said position is switched over to the right side position, the said two pilot flows will stop opposing each other and the two split-type valve spools 15 will be switched to the load condition. Thus, the hydraulic actuating fluids from pumps 80*a*, 80*b* of low and high pressure will flow into the annular groove 23, while opening the second valve spool 54 of the split-type valve spools 15 respectively, and merge there to proceed to the supply circuit 78 through the outer port 26. In this case, if the pressure of the said supply circuit 78 side exceeds the set pressure of unload valve 84 and opens it, this produces a pilot flow on the pilot passage 76 side, the low pressure pump 80*a* will be switched to an unloaded condition automatically and only the hydraulic actuating fluid from high pressure pump 80*b* will be sent to the supply circuit 78 side. In the said example, if the pilot circuit is modified as shown in FIG. 23, it will be possible not only to make the low pressure pump 80*a* and the high pressure pump 80*b* selectively switch to a load condition by the switching action of solenoid valve 82*c*, but also to load both of these pumps 80*a*, 80*b* or to load only the high pressure pump 80*b* by switching of solenoid valve 82*d* arranged as shown in FIG. 24.

Figure 25:
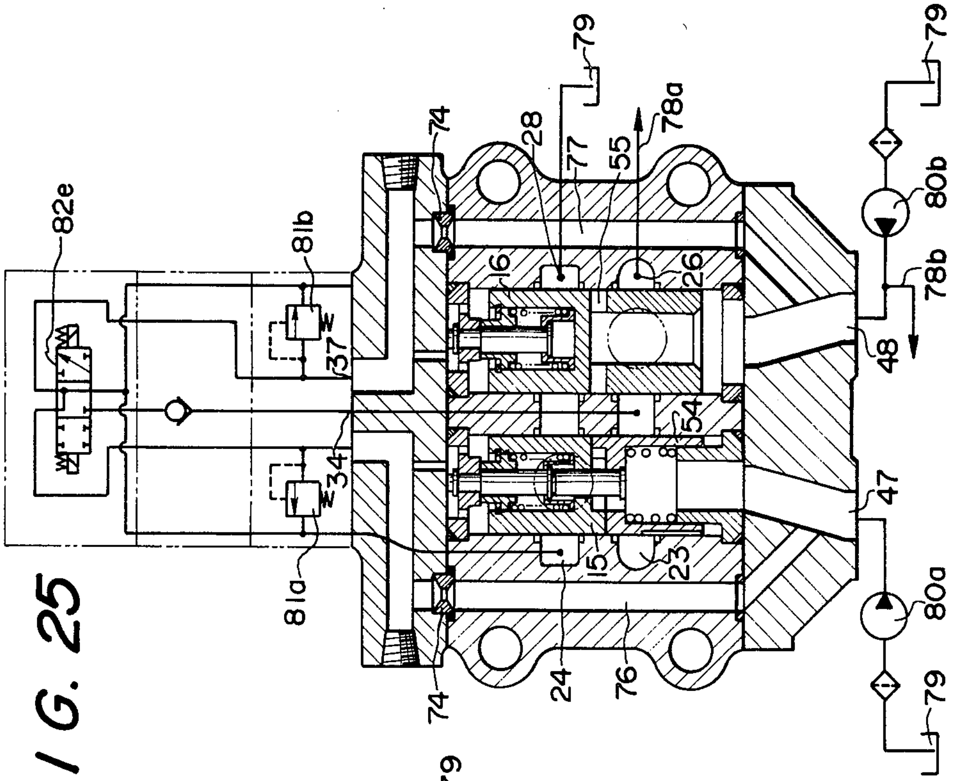
FIG. 25 represents a circuit diagram indicating a common application example where the fluid control valve is used for carryover and relief in the same two-series pump circuit.
Figure 26:
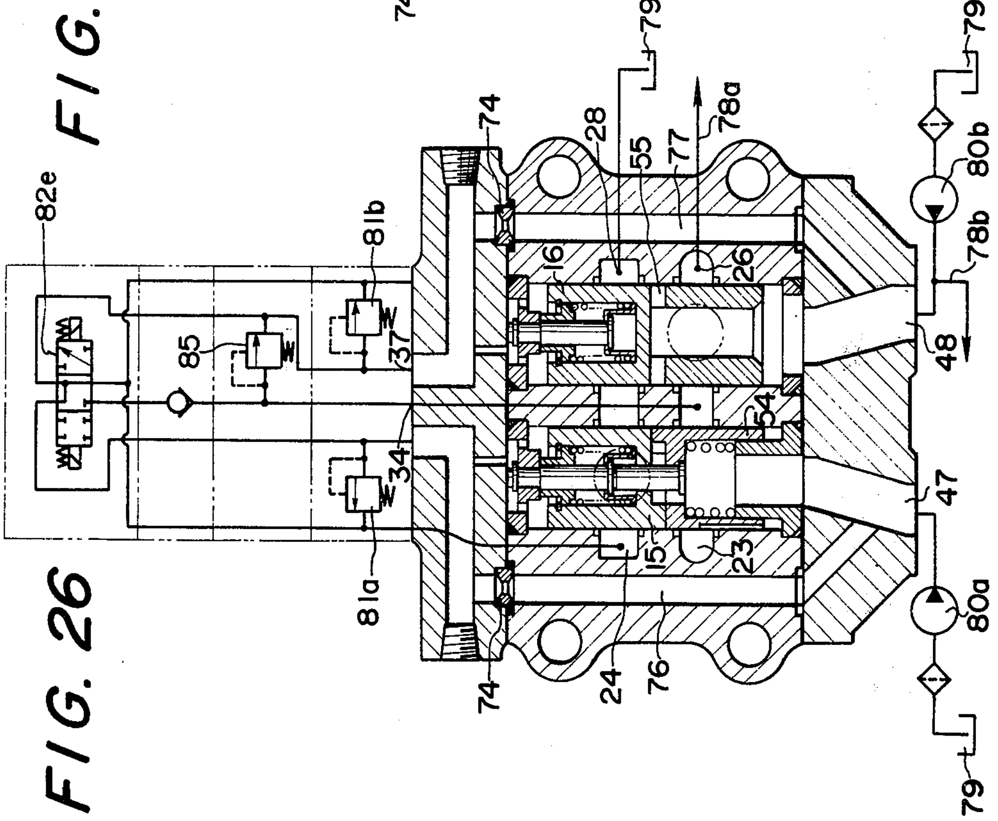
FIG. 26 also represents a circuit diagram indicating an application example where an automatic sequence is effected.

Furthermore, if such a circuit as shown in FIG. 25 is made by using a fluid control valve which is the same as employed in FIG. 21, it will be possible not only to keep both the low and high pressure pumps 80*a*, 80*b* under load by switching solenoid valve 82*e* to the left side position so that hydraulic actuating fluids from these pumps may be sent separately to the primary and the secondary side supply circuits 78*a*, 78*b* to effect independent drives respectively, but also to introduce into pilot passage 77, if necessary, a pilot flow from the pilot port 37 towards the outer port 48 by switching solenoid valve 82*e* to the right side position, so that valve spool 16 may be switched downwards to effect the carryover of hydraulic actuating fluid from the low pressure pump 80*a* to the secondary side supply circuit 78*b*. In particular, with the pilot circuit made as shown in FIG. 26, for the independent driving condition, if the set pressure of sequence valve 85 is lower than that of relief valve 81*a* of the low pressure pump 80*a*, the sequence valve 85 will open separately before the pressure of the primary supply circuit 78*a* reaches the set pressure of the relief valve 81*a*. Thus, a pilot flow towards the outer port 48 side may be introduced into pilot passage 77 from pilot port 37, and the valve spool 16 may be switched downwards automatically to effect carryover of the hydraulic actuating fluid from the low pressure pump 80*a* to the secondary side supply circuit 78*b*. In this case, power loss may also be minimized. In the circuits of FIGS. 25 and 26, if the set pressure of the secondary side relief valve 81*b* is higher than that of the primary side relief valve 81*a*, no troubles will occur, because the primary side relief valve 81*a* will open automatically as the pressure of the secondary side supply circuit 78*b* exceeds the set pressure of the primary side relief valve 78*a*. In the reverse case, however, the secondary relief valve 81*b* will open prior to the primary relief valve 81*a* and the maximum pressure of the primary side will be limited by the secondary side relief valve 81*b*. For this reason, it becomes necessary to install a flow control valve (not shown in the figure) in the pilot circuit of supply port 34 so as to limit the pilot flow and drain it from the secondary side relief valve 81*b* to the tank 79.

Figure 27:
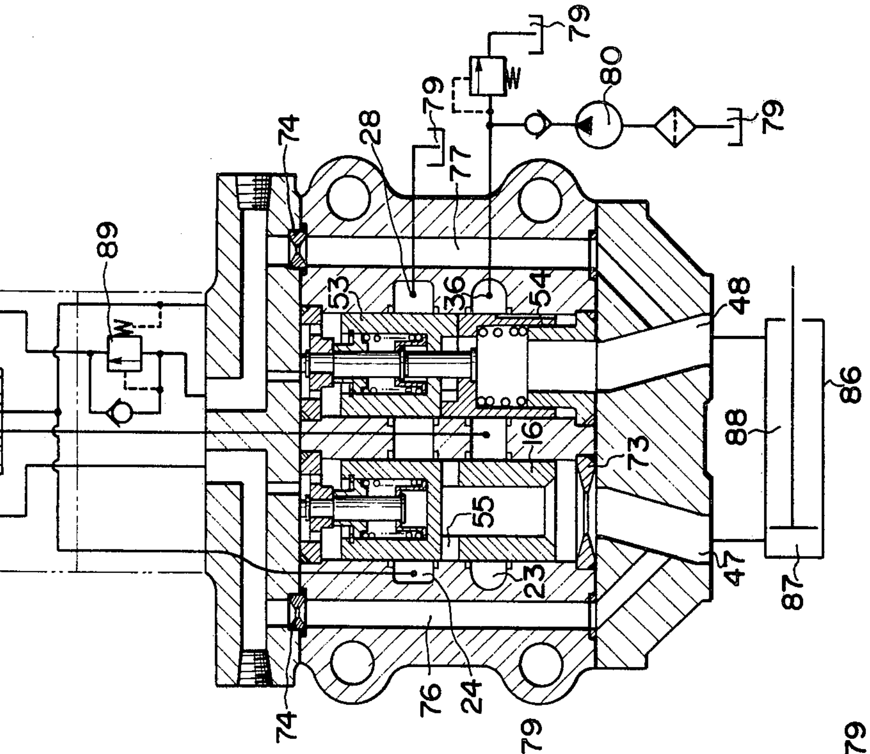
FIGS. 27 and 28 show circuit diagrams indicating application examples of a quick-feed circuit for actuators such as cylinders.
Figure 28:
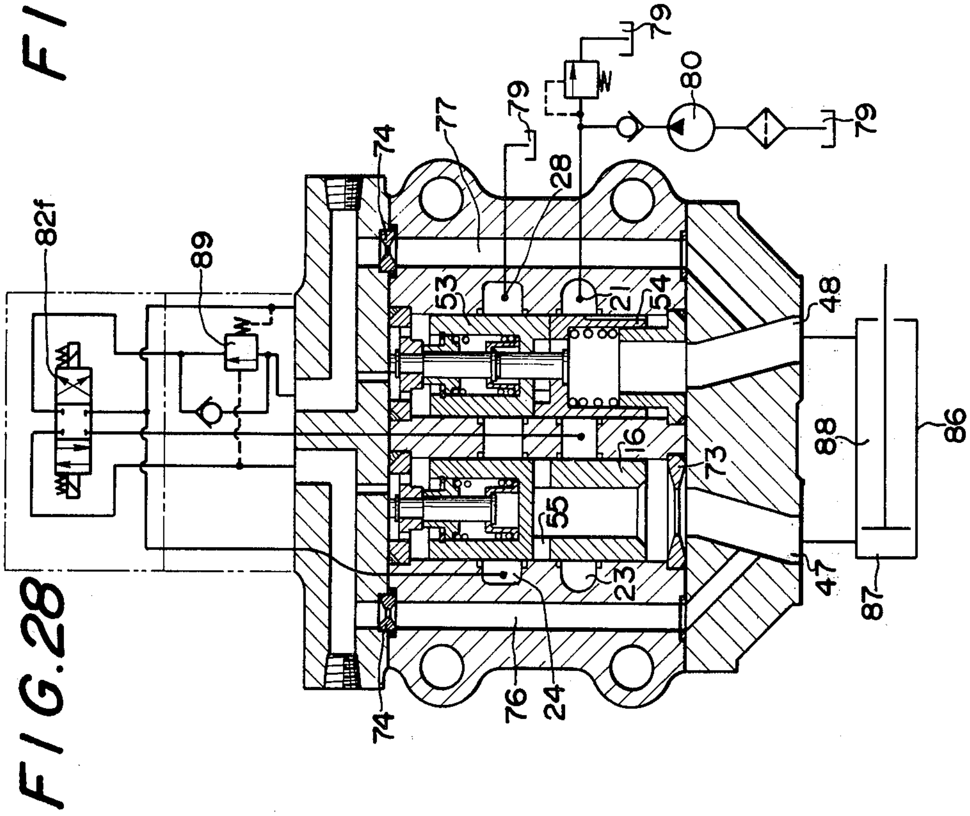

In addition, FIGS. 27 and 28 indicate an example of application to quick-feed circuits using actuators such as cylinders, etc. In the example, the hydraulic actuating fluid from a pump 80 is led into the left chamber 87 of an actuator 86 through a detection orifice 74 and pilot passage 76 of the left side by switching a solenoid valve 82*f* to the left side position and, as valve spool 16 is switched downwards, the hydraulic actuating fluid from pump 80 is sent to the left chamber 87 of the actuator 86 directly through the annular groove 23 and the through hole 55 of valve spool 16. In this case, if main orifice 73 is connected to the lower end of valve chamber 19, valve spool 16 will be balanced when the differential pressure produced in the pilot flow in front of and behind detection orifice 74 becomes equal to that produced in front of and behind the main orifice 73. Thus, it is possible to control the main flow by using a certain amplification of the pilot flow. Although the actuating fluid forced out from the right side chamber 88 of the actuator 86 tends to return to the tank 79 side through the right side pilot passage 77, its return is stopped by the sequence valve 89 located at a point along the passage. The actuating fluid forced out from the right side chamber 88, therefore, opens the second valve spool 54 of split-type valve spool 15 and merges with the hydraulic actuating fluid from pump 80 to proceed from the annular groove 23 to the left side chamber 87, resulting in the actuator 86 being quick-fed. However, if the load pressure of actuator 86 is increased beyond the set pressure of sequence valve 89, for example if it contacts some other material, the load pressure will be detected (FIG. 27 indicates the secondary side detection type, while FIG. 28 indicates the primary side detection type.) and sequence valve 89 will open. As a result, a pilot flow returning to the tank 79 through the pilot circuit 77 and the detection orifice 74 is produced and the first valve spool 53 of split-type valve spool 15 is switched upwards, so that the right side chamber 88 of the actuator 86 is opened directly from the annular groove 24 to the tank side 79. Thus, its thrust is increased and the quick-feed operation is switched to ordinary operation.

Figure 29:
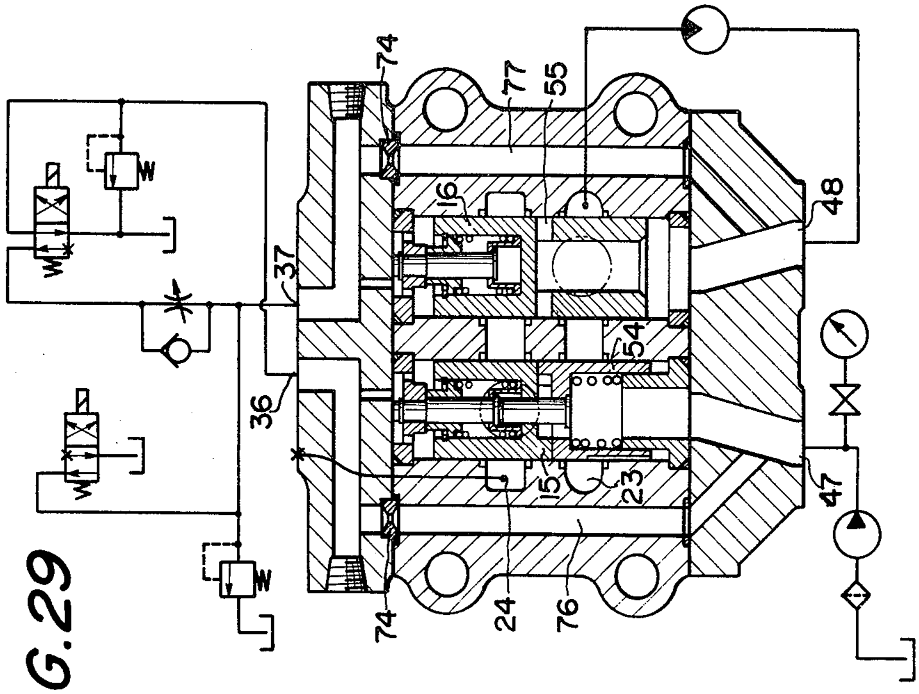
FIG. 29 represents a circuit diagram indicating an application example of a high-low speed switchover circuit.
Figure 30:
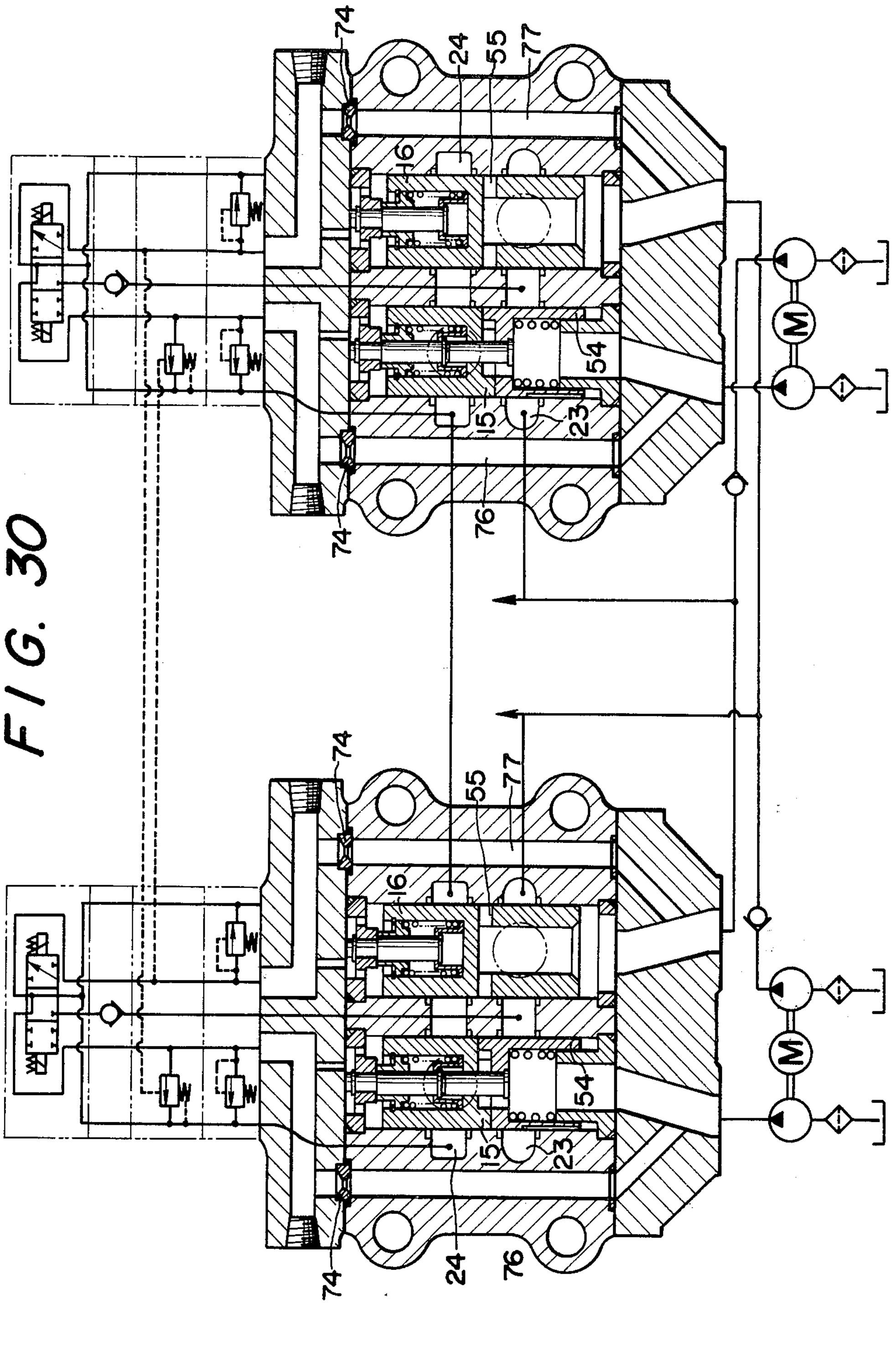
FIGS. 30 and 31 represent circuit diagrams indicating application examples appropriate for the control circuit of scrap presses, etc.
Figure 31:
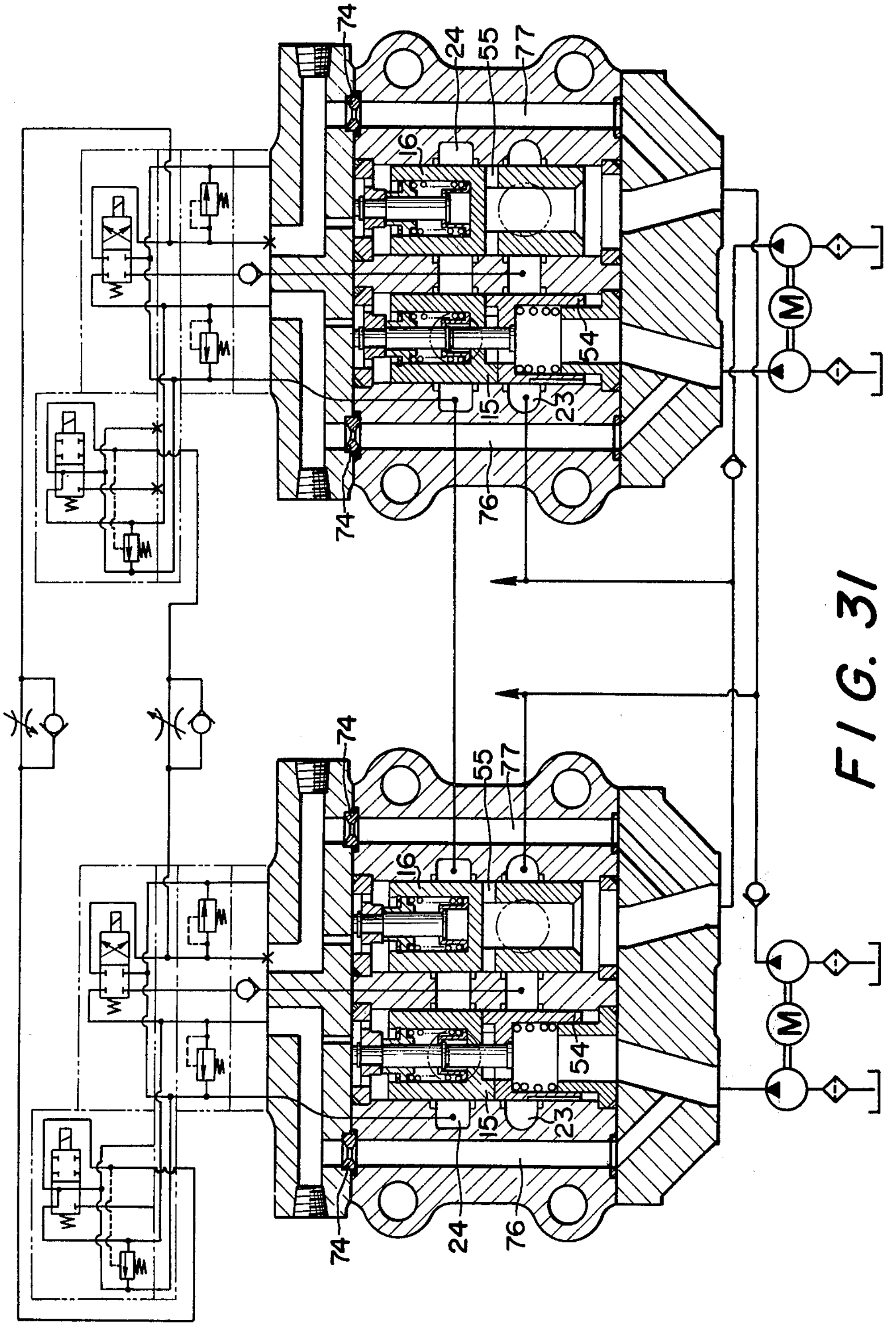

In addition, various other circuits may also be formed, but it would be too complex to explain all of these. Therefore, only typical examples will be given for reference, i.e., FIG. 29 and FIGS. 30 and 31 indicate a high-low speed switch circuit and a circuit appropriate for controlling scrap presses, etc., respectively.

As stated above, it is possible, by using a valve body constructed according to the present invention, to fabricate a fluid control valve applicable to various circuits, where valve spools of a split-type 15 and non-split type 16 and blind stoppers 17, 18 are arranged as desired in the said valve body 14 cylinder sections. This is quite an effective means of production control as well of standardizing this type of fluid control valve.

What is claimed is:

1. A fluid control valve consisting of the following:

a valve body having a cylindrical valve chamber;

port mechanisms utilizing a first outer port, and second and third outer ports all connected to the valve chamber, where the first and the second ports form a supply side main flow passage passing the valve chamber at its end, while the first and the third ports form a discharge side main flow passage passing the valve chamber at its end;

a valve spool held in the said valve chamber and consisting of a first valve spool and a second valve spool, where the first valve spool slides inside the valve chamber between positions to complete or cut the main flow passage on the discharge side, while the second valve spool under the supply pressure, can open the main flow passage on the supply side;

passages to form a pilot flow passage bypassing the valve chamber;

a limit orifice mechanism installed in the pilot flow passage; and a passage mechanism for merging the pilot flow and the main flow in the vicinity of the first outer port and controlling displacement of the first valve spool as well, by means of a differential pressure produced in the flow passing a limit orifice mechanism.

2. A fluid control valve consisting of the following:

a valve body having a first cylindrical valve chamber and a second cylindrical valve chamber;

a port mechanism utilizing first and fourth outer ports and second and third outer ports passing through the first and the second valve chambers, where the first port and the second and third ports form the first and the second main flow passages passing the first valve chamber at its end, while the fourth port and the second and third ports form the third and the fourth main flow passages passing the second valve chamber at its end;

a split-type valve spool held in the first valve chamber and consisting of a first valve spool and a second valve spool, where the first valve spool slides inside the first valve chamber between positions to complete or cut the second main flow passage, while the second valve spool is affected by the supply pressure to open the first main flow passage;

a blind stopper held in the second valve chamber to stop the fourth main flow passage;

passages bypassing the first and the second valve chambers to form the first and the second pilot flow passages;

a limit orifice mechanism installed in the first pilot flow passage;

a blind stopper mechanism to stop the second pilot flow passage; and a passage mechanism for connecting the first and the second pilot flow passages to the upper and the lower parts of the first and the second valve chambers, respectively, while utilizing the said orifice and blind stopper mechanisms, and controlling displacement of the first valve spool in the first valve chamber by means of a differential pressure produced by the flow passing the limit orifice mechanism arranged in the first pilot flow passage.

3. A fluid control valve consisting of the following:

a valve body having a first cylindrical valve chamber and a second cylindrical valve chamber;

a port mechanism utilizing first and fourth outer ports and second and third outer ports passing through the first and the second valve chambers, where the first port and the second and third ports form the first and the second main flow passages passing through the first valve chamber at its end, while the fourth port and the second and third ports form the third and the fourth main flow passages passing through the second valve chamber at its end;

two split-type valve spools held in the first and the second valve chambers respectively and consisting of first valve spools and second valve spools, where the first valve spools slide inside the first and the second valve chambers between positions to complete or stop, independently, the second and the fourth main flow passages, while the second valve spools, affected by the supply pressure, work to open the first and the third main flow passages;

passages bypassing the first and the second valve chambers to form the first and the second pilot flow passages;

first and second limit orifice mechanisms arranged in the first and the second pilot flow passages; and a passage mechanism connecting the first and the second pilot flow passages to the upper and the lower parts of the first and the second valve chambers respectively, using the first and the second orifice mechanisms, and controlling displacement of the first valve spools in the first and the second valve chambers by means of differential pressures produced by the flow passing the first and the second orifice mechanisms in the first and the second pilot flow passages, respectively;

4. A fluid control valve consisting of the following:

a valve body having a first cylindrical valve chamber and a second cylindrical valve chamber;

a port mechanism involving first and fourth outer ports and second and third outer ports passing through the first and the second valve chambers, where the first port and the second and third ports form the first and the second main flow passages passing through the first valve chamber at its end, while the fourth port and the second and third ports form the third and the fourth main flow passages passing through the second valve chamber at its end;

a split-type valve spool held in the first valve chamber and consisting of first and second valve spools, wherein the first valve spool slides inside the first valve chamber between positions to complete or stop the second main flow passage, while the second valve spool works, affected by the hydraulic pressure, to open the first main flow passages;

a non-split type valve spool held in the second valve chamber and incorporating a third valve spool which may slide alternately between a neutral position to stop both the third and the fourth main flow passages and another position to complete these passages;

passages bypassing the first and the second valve chambers to form the first and the second pilot flow passages;

first and second limit orifice mechanisms installed in the first and the second pilot flow passages; and a passage mechanism for connecting the first and the second pilot flow passages to the upper and the lower parts of the first and the second valve chambers respectively, utilizing the said first and second orifice mechanisms, and controlling displacements of the first valve spool in the first valve chamber and the third valve spool in the second valve chamber by means of differential pressures produced by a flow passing the first and the second limit orifice mechanisms in the first and the second pilot flow passages respectively.

* * * * *